United States Patent

Sugawara

[11] Patent Number: 5,333,977
[45] Date of Patent: Aug. 2, 1994

[54] BOLT HAVING A LOCKING MEANS

[75] Inventor: Minoru Sugawara, Odawara, Japan

[73] Assignee: Ishion Corporation Co., Ltd., Tokyo, Japan

[21] Appl. No.: 131,325

[22] Filed: Oct. 4, 1993

[30] Foreign Application Priority Data

Jun. 14, 1993 [JP] Japan .................. 5-165888

[51] Int. Cl.⁵ .............. F16B 13/06; F16B 39/02
[52] U.S. Cl. .................. 411/271; 411/51; 411/325
[58] Field of Search .......... 411/271, 325, 954, 55, 411/60, 50, 51

[56] References Cited

U.S. PATENT DOCUMENTS

| | | | |
|---|---|---|---|
| 990,065 | 4/1911 | Sargeant | 411/271 |
| 1,166,049 | 12/1915 | Hyde | 411/954 X |
| 2,071,363 | 2/1937 | Shannon | 411/271 |
| 3,602,186 | 8/1971 | Popenoe | 116/114 |
| 3,987,668 | 10/1976 | Popenoe | 73/88 |
| 3,987,699 | 10/1976 | Popenoe | |
| 4,114,428 | 9/1978 | Popenoe | 73/88 |
| 5,219,254 | 6/1993 | Ball, Sr. et al. | 411/271 |

FOREIGN PATENT DOCUMENTS 2305108 10/1976 France .................. 411/271

Primary Examiner—Neill R. Wilson
Attorney, Agent, or Firm—DeLio & Peterson

[57] ABSTRACT

A locking bolt consists of a main bolt with a through hole extending axially along its center line, a deforming bolt rotatably mounted in the through hole in the main bolt, and a nut which is screwed onto the end of the deforming bolt. At least one slit is provided in the end of the shaft of the main bolt, and when the nut is tightened the deforming bolt expands the end portion of the shaft of the main bolt. At the end of the shaft the through hole in the main bolt is provided with a tapered hole portion of which the diameter decreases gradually from the tip of the shaft toward the head of the main bolt, and the head of the deforming bolt is tapered so that it fits into the tapered hole portion. When the nut is tightened, the deforming bolt jams the thread on the end portion of the shaft of the bolt against the thread of the bolt hole, and thereby prevents the bolt from becoming loose.

4 Claims, 2 Drawing Sheets

BOLT HAVING A LOCKING MEANS

BACKGROUND OF THE INVENTION

This invention relates primarily to a bolt to be used for long-term fastening, and more particular, to a bolt having a locking means suitable for use in places subject to mechanical vibrations or the like.

As is widely known, bolts are convenient means for joining parts together and are used in various fields. However, although bolts allow parts to be detachably joined together easily, they have a disadvantage that they are easily loosened due to mechanical vibrations and the like.

In order to prevent this loosening, means such as spring washers and double nuts are used. However, when mechanical vibrations, and particularly low amplitude vibrations, are continuously applied to a bolt, although the loosening of the bolt is gradual it nevertheless even totally loosens to a point at which it has to be retightened.

Recently, chemical agents which individually attempts to prevent the bolt from loosening by filling up the gaps between the screw threads of the bolt and the threaded hole into which the bolt engaged with such a chemical agent have been marketed and confirmed as being effective in preventing bolt from becoming loose. However, even when such a chemical agent is used, when the vibration applied to the bolt is of low amplitude and is strong the agent has very little effect, and in practice such chemical agents are only used in restricted fields.

This invention aims to provide a locking bolt or a bolt having a locking means which can be used in the same way as a conventional bolt, and which can be prevented from becoming loose by a simple locking operation.

SUMMARY OF THE INVENTION

The bolt having the locking means according to this invention is comprises a main bolt with a through hole extending axially along the center line thereof, a deforming bolt rotatably mounted in the through hole in the main bolt, and a nut which is engaged on the end portion of the deforming bolt.

The through hole in the main bolt is provided with a tapered hole in the tip portion of the threaded shaft of the main bolt, which tapered hole tapers in such a way that its diameter gradually decreases from the tip in the direction of the head of the main bolt, and at least one slit is provided in the tip portion of the main bolt in such a way that the slit cuts through the wall of the tip portion from the exterior of the main bolt to the interior of the tapered hole. The deforming bolt is provided with at least one notch in its head and the head of the deforming bolt is tapered in such a way that it fits into the tapered hole of the main bolt. The nut is screwed onto the end of the shaft of the deforming bolt in a recess formed in the head of the main bolt.

The locking bolt according to this invention works in the following way. The locking bolt is screwed into a threaded hole in the same way as with a conventional bolt, and then the nut is tightened, causing the head of the deforming bolt to move in the direction of the head of the main bolt. This causes the tip portion providing with the slit of the shaft of the main bolt to be partially expanded radially outwardly by the head of the deforming bolt, and the screw thread on the tip portion of the main bolt are forced against the screw thread in the threaded bolt hole and, therefore, the main bolt is prevented from becoming loose.

When the nut is tightened, the tapered head of the deforming bolt in the tapered hole of the main bolt only exerts an outward expanding force on the tip portion of the main bolt, and reliable mutual engagement between the screw threads of the main bolt and the bolt hole is ensured.

DETAILED DESCRIPTION OF THE INVENTION

Figure 1:
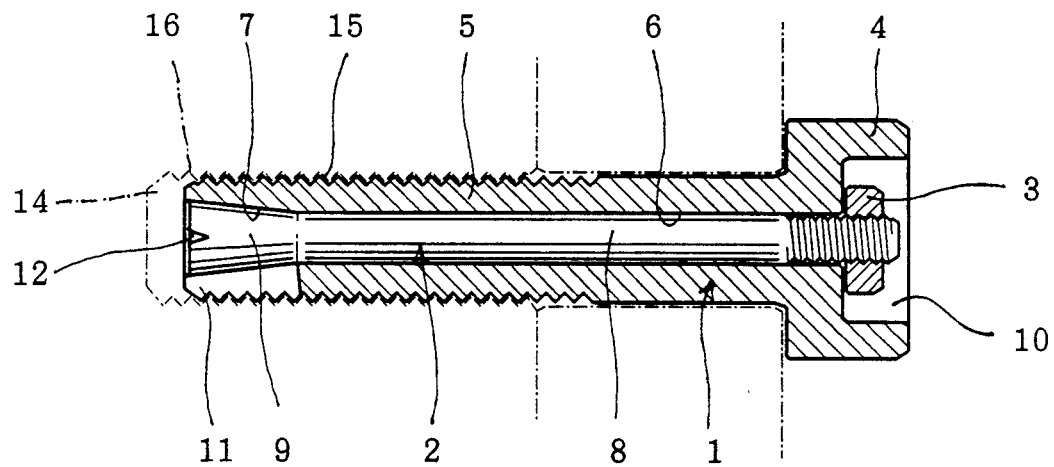
FIG. 1 is a cross-sectional view of a locking bolt according to a preferred embodiment of the present invention.

As shown in FIG. 1, the locking bolt of this preferred embodiment according to the invention comprises a main bolt 1, a deforming bolt 2, and a nut 3.

The main bolt 1 has a through hole 6 running axially through its core from the head 4 through the shaft 5 to the tip, and in the shaft end portion of the main bolt 1 the through hole 6 is provided with a tapered hole portion 7 where the diameter of the through hole 6 gradually decreases from the tip of the main bolt 1 in the direction of the head of the main bolt 1.

The deforming bolt 2 is rotatably mounted with its untapered shaft portion 8 in the untapered part of the through hole 6. The head 9 of the deforming bolt 2 is accommodated in the tapered hole portion 7 of the through hole 6 in the main bolt 1, and is provided with a taper for expanding the inner wall surface of the tapered hole portion 7 outward when the deforming bolt is tightened.

Figure 2:
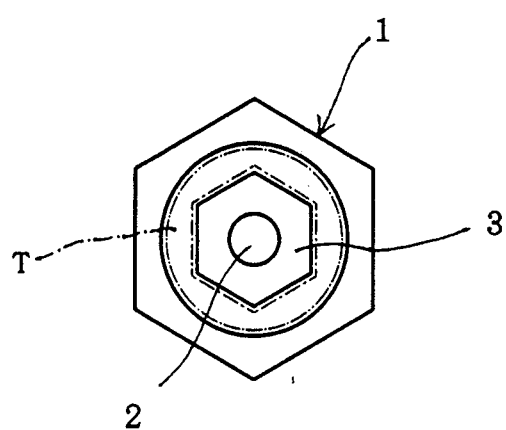
FIG. 2 is an end elevation view of the head end of the locking bolt of FIG. 1.

A circular recess 10 is formed in the head 4 of the main bolt 1, and the dimensions of this recess 10 are such that the nut 3 is accommodated and also such that space is provided for a tool such as a head of a box wrench T (see FIG. 2) for tightening the nut 3 to be fitted onto the nut 3. The deforming bolt 2 is positioned in such a way that the end of its shaft portion 8 projects into the recess 10, and the nut 3 is screwed onto this projecting portion.

At least one slit 11 is provided in the wall defining the tapered hole portion 7, extending axially some way along the main bolt 1. This slit 11 serves to partially weaken the end portion of the shaft of the main bolt 1, and the number of the slits provided and their size and shape should be determined according to the material and the size and shape of the locking bolt being produced.

Figure 3:
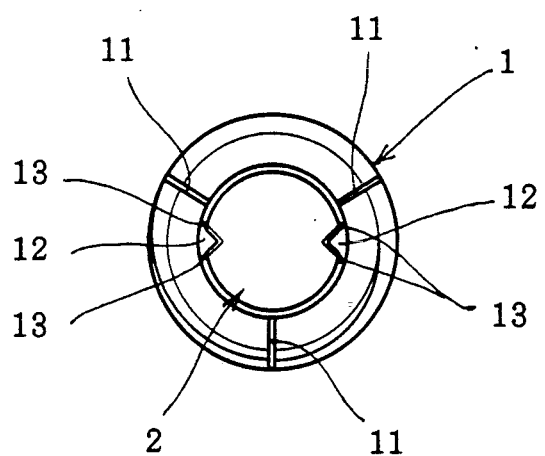
FIG. 3 is an end elevation view of the shaft tip end of the locking bolt of FIG. 1.

At least one notch 12 is formed in the side of the head 9 of the deforming bolt 2. The notch 12 is stamped by using a chisel tool or the like, and in this way irregular projecting portions 13 (see FIG. 3) are formed at the outer edges of the notch 12.

The bolt assembly constructed as described above according to the invention is screwed into a bolt hole in the same way as a conventional bolt, and then the nut 3 is tightened. When the nut 3 is tightened, the head 9 of the deforming bolt positioned in the tapered hole portion 7 of the main bolt moves toward the head 4 of the main bolt. This causes the head 9 of the deforming bolt to exert an outward expanding force on the inner wall surface defining the tapered hole portion 7. During this process a projecting portion 13 of the notch 12 engages with the slit 11 in the main bolt 1 and the deforming bolt 2 is prevented from rotating together with the nut 3.

When the end portion of the shaft of the main bolt 1 expands outward under the action of the head 9 of the deforming bolt 2, the ridges of the thread on the end portion of the shaft of the main bolt 1 are caused to bite into the screw thread of the bolt hole 14, and therefore further rotation of the main bolt 1 is mechanically obstructed and loosening of the bolt is prevented.

In accordance with this invention, the locking bolt is fitted into a bolt hole in the same way as a conventional bolt, the nut on the deforming bolt is tightened so that the distance between the nut and the head of the deforming bolt is shortened, the slit end of the shaft of the main bolt is caused to partially expand outwardly, the ridges of the thread on the end portion of the shaft of the main bolt are thereby jammed against the screw thread of the bolt hole, and loosening of the main bolt is prevented.

And, because the head of the deforming bolt is accommodated in a tapered hole portion in the main bolt, and, when the nut is tightened to shorten the distance between the nut and the head of the deforming bolt, the deforming bolt is prevented from rotating along with the nut by a projecting portion of the notch engaging with the slit in the main bolt, the head of the deforming bolt only exerts an outward expanding force on the end portion of the shaft of the main bolt, and the bolt hole are reliably engaged together.

Furthermore, because the nut is accommodated in the concave recess 10 in the head of the main bolt, the locking bolt can have similar external dimensions and shape and appearance to those of a conventional bolt, and locking bolts which can replace previously deployed conventional bolts can be easily made.

Also, because a locking bolt according to this invention can be manufactured by making a through hole in a bolt main body substantially the same as a conventional bolt, making a deforming bolt as a single forging, cutting a thread on the deforming bolt, and using an ordinary nut, the manufacturing process can be simple and a locking bolt can be made at low cost.

What is claimed is:

1. A locking bolt comprising:

a main bolt having a head and a tip with a through hole extending axially along its center line, wherein the through hole in the main bolt is provided along at least a portion thereof with a tapered hole portion which gradually tapers in such a way that its diameter is greatest at the tip of the bolt shaft and decreases in the direction of the head of the bolt, and at least one slit is provided in the main bolt wherein the slit cuts through from the exterior of the main bolt to the interior of the tapered hole portion, and a deforming bolt having a threaded end and a tapered end which tapered end fits into the tapered hole portion of the through hole in the main bolt and which is rotatably mounted in the through hole in the main bolt with the threaded end extending beyond the through hole in the main bolt to engage a tightening nut, and the deforming bolt is provided with at least one notch in the tapered end thereof, the notch having a projecting portion on the outer edge of the notch, and when the nut is screwed onto the threaded end portion of the shaft of the deforming bolt and tightened the projecting portion of the notch of the deforming bolt engages the slit and the deforming bolt is prevented from rotating together with the nut and the tapered end of the deforming bolt moves toward the head of the main bolt and the tapered end of the main bolt expands radially.

2. The locking bolt of claim 1 wherein the head of the main bolt has a circular recess to accommodate the nut of the deforming bolt.

3. The locking bolt of claim 2 wherein the threaded end of the deforming bolt does not extend beyond the end of the head of the main bolt.

4. The locking bolt of claim 1 having multiple slits and multiple notches.

* * * * *

UNITED STATES PATENT AND TRADEMARK OFFICE
CERTIFICATE OF CORRECTION

PATENT NO. : 5,333,977
DATED : August 2, 1994
INVENTOR(S) : Minoru Sugawara

It is certified that error appears in the above-identified patent and that said Letters Patent is hereby corrected as shown below:

In column 3, line 31, after "bolt", and before "and", please insert
- -and the threads of the main bolt- -.

Signed and Sealed this

Fourth Day of October, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,333,977
DATED : August 2, 1994
INVENTOR(S) : Minoru Sugawara

It is certified that error appears in the above-identified patent and that said Letters Patent is hereby corrected as shown below:

On the Title Page

In item [73] (Assignee), please delete "Ishion" and substitute therefor - -Ishino- -.

Signed and Sealed this

Twenty-first Day of March, 1995

Attest:

BRUCE LEHMAN

Attesting Officer

Commissioner of Patents and Trademarks